United States Patent
Lee et al.

(10) Patent No.: US 10,201,943 B2
(45) Date of Patent: Feb. 12, 2019

(54) METHOD FOR MANUFACTURING NEARLY-NATURAL BLACK POLARIZING PLATE AND POLARIZING PLATE MANUFACTURED THEREBY

(71) Applicant: LG CHEM, LTD., Seoul (KR)

(72) Inventors: Byung Sun Lee, Daejeon (KR); Sung Hyun Nam, Daejeon (KR); Kyun Il Rah, Daejeon (KR)

(73) Assignee: LG CHEM, LTD., Seoul (KR)

( * ) Notice: Subject to any disclaimer, the term of this patent is extended or adjusted under 35 U.S.C. 154(b) by 230 days.

(21) Appl. No.: 15/025,163

(22) PCT Filed: Sep. 26, 2014

(86) PCT No.: PCT/KR2014/009043
§ 371 (c)(1),
(2) Date: Mar. 25, 2016

(87) PCT Pub. No.: WO2015/046962
PCT Pub. Date: Apr. 2, 2015

(65) Prior Publication Data
US 2016/0229135 A1 Aug. 11, 2016

(30) Foreign Application Priority Data
Sep. 30, 2013 (KR) .................. 10-2013-0117012
Sep. 23, 2014 (KR) .................. 10-2014-0126250

(51) Int. Cl.
*B29D 11/00* (2006.01)
*B05D 3/04* (2006.01)
(Continued)

(52) U.S. Cl.
CPC ...... *B29D 11/00644* (2013.01); *B05D 3/0486* (2013.01); *B05D 3/06* (2013.01);
(Continued)

(58) Field of Classification Search
CPC ........ B29D 11/00644; B29D 11/00894; B05D 3/0486; B05D 3/06; B05D 3/108;
(Continued)

(56) References Cited

U.S. PATENT DOCUMENTS 2,375,963 A * 5/1945 Thomas ............... G02B 5/3033
264/1.35
5,622,648 A 4/1997 Parri et al.
(Continued)

FOREIGN PATENT DOCUMENTS

| CN | 1241037 C | 2/2006 |
|---|---|---|
| JP | 2002-174728 A | 6/2002 |

(Continued)

*Primary Examiner* — Stephone B Allen
*Assistant Examiner* — Adam W Booher
(74) *Attorney, Agent, or Firm* — Dentons US LLP

(57) ABSTRACT

The present invention relates to a method for manufacturing a polarizing plate, the method comprising the sequential steps of: preparing a polarizing element comprising a polyvinyl alcohol-based polarizer dyed with any one or more of iodine and a dichroic dye; irradiating the polarizing element with light having a specific wavelength selected from a wavelength range of 200 nm to 800 nm; and moistening the polarizing element, and to a polarizing plate manufactured by the method.

2 Claims, 2 Drawing Sheets

(51) Int. Cl.
    *B05D 3/06*     (2006.01)
    *B05D 3/10*     (2006.01)
    *B05D 7/04*     (2006.01)
    *B29C 55/00*     (2006.01)
    *B29C 55/04*     (2006.01)
    *G02B 5/30*     (2006.01)
    *B29K 105/00*     (2006.01)
    *B29K 29/00*     (2006.01)
    *B29L 11/00*     (2006.01)

(52) U.S. Cl.
    CPC ............... B05D 3/108 (2013.01); B05D 7/04 (2013.01); B29C 55/005 (2013.01); B29C 55/04 (2013.01); B29D 11/00894 (2013.01); G02B 5/305 (2013.01); *B29K 2029/04* (2013.01); *B29K 2105/0032* (2013.01); *B29K 2105/256* (2013.01); *B29K 2995/002* (2013.01); *B29K 2995/0034* (2013.01); *B29L 2011/0066* (2013.01)

(58) Field of Classification Search
    CPC ......... B05D 3/061–3/067; B05D 3/107; B05D 7/04; B05D 7/02; B29C 55/005; B29C 55/02; B29C 55/04–55/085; G02B 5/30; G02B 5/3025–5/305; B29K 2029/04; B29K 2105/0032; B29K 2105/256; B29K 2995/0018; B29K 2995/002; B29K 2995/0034; B29L 2011/0066
    See application file for complete search history.

(56) References Cited

U.S. PATENT DOCUMENTS

| | | | |
|---|---|---|---|
| 6,833,090 B2 * | 12/2004 | Tsuchimoto | B29C 55/04 264/1.34 |
| 2003/0072078 A1 | 4/2003 | Higashio et al. | |
| 2007/0159576 A1 * | 7/2007 | Tanabe | G02B 1/105 349/96 |
| 2007/0289497 A1 * | 12/2007 | Suzuki | C09D 133/16 106/287.24 |
| 2012/0113356 A1 | 5/2012 | Yu et al. | |
| 2013/0107173 A1 | 5/2013 | Takeda et al. | |

FOREIGN PATENT DOCUMENTS

| | | |
|---|---|---|
| JP | 2003-185845 A | 7/2003 |
| JP | 2006-072315 A | 3/2006 |
| JP | 2012-234112 A | 11/2012 |
| JP | 2013-092707 A | 5/2013 |
| KR | 2003-0025213 A | 3/2003 |
| KR | 2007-0015428 A | 2/2007 |
| KR | 2013-0046379 A | 5/2013 |
| KR | 2013-0093049 A | 8/2013 |

* cited by examiner

[Figure 1]
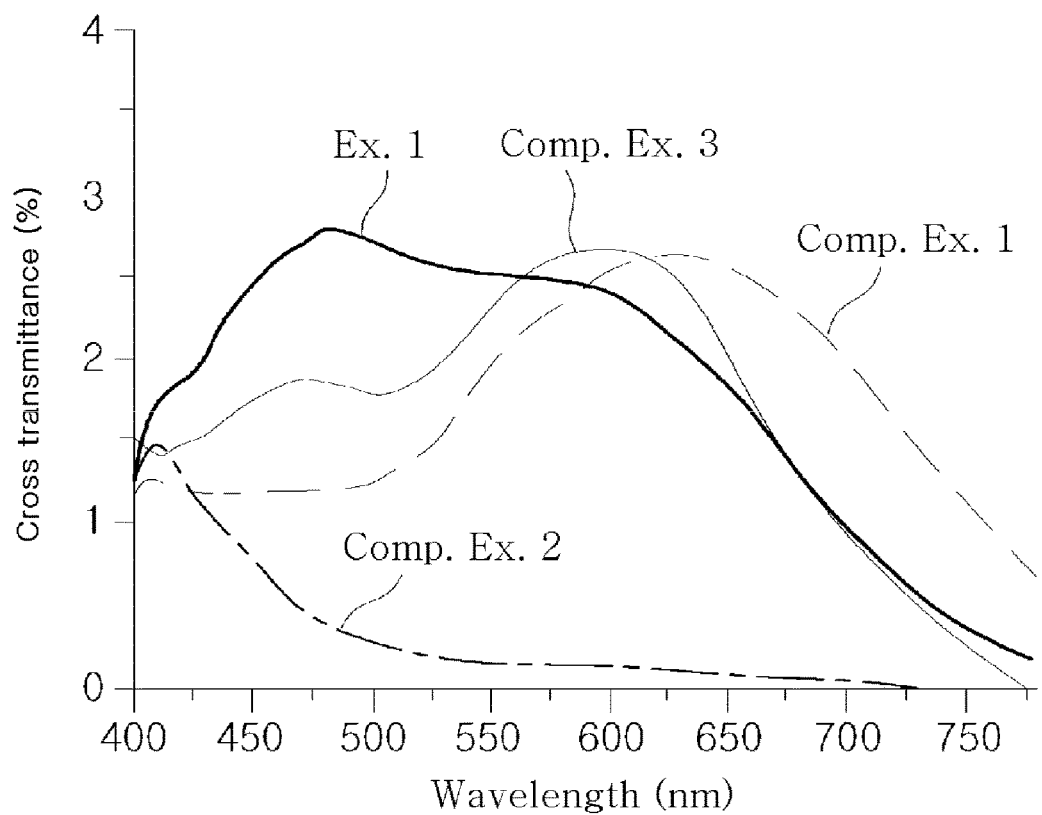

[Figure 2]
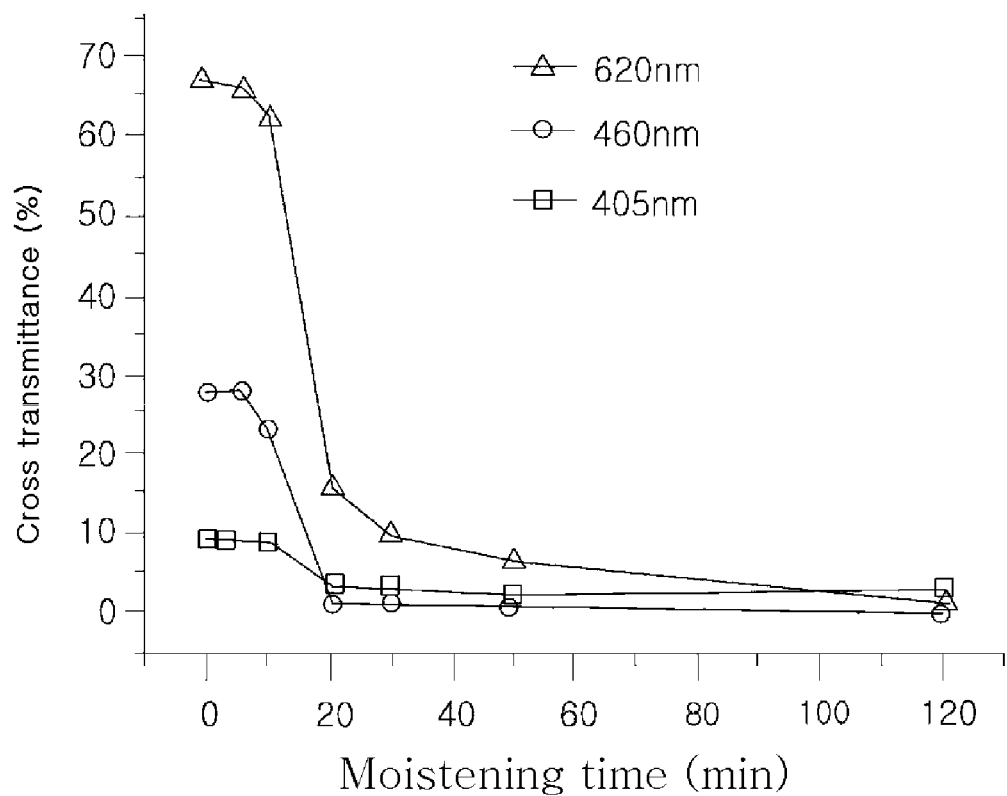

METHOD FOR MANUFACTURING NEARLY-NATURAL BLACK POLARIZING PLATE AND POLARIZING PLATE MANUFACTURED THEREBY

This application is a National Phase entry of PCT/KR2014/009043 filed on Sep. 26, 2014 and claims priority to Korean Application Nos. 10-2013-0117012 filed Sep. 30, 2013 and 10-2014-0126250 filed Sep. 23, 2014 in the Korean Intellectual Property Office, all of which are incorporated by reference for all purposes as if fully set forth herein.

TECHNICAL FIELD

The present invention relates to a method for manufacturing a polarizing plate, and a polarizing plate manufactured thereby, and more particularly, to a method for manufacturing a polarizing plate that may be used in image display devices, including a liquid crystal display, an organic light-emitting display device and a plasma display panel (PDP), and to a polarizing plate manufactured by the method.

BACKGROUND ART

Generally, in a liquid crystal display, it is required to dispose a polarizer on both sides of a glass substrate of a liquid crystal panel in order to provide bright images with good color saturation. The polarizer is generally manufactured by dyeing a polyvinyl alcohol (PVA)-based film with a dichroic dye such as iodine, crosslinking the dyed film using a crosslinking agent, and then aligning the molecules of the film by a process such as uniaxial stretching. Because the polarizer is manufactured by stretching, it is easy to shrink. Particularly, because the polyvinyl alcohol-based film is based on a hydrophilic polymer, it is easy to deform under moist heat conditions. In addition, because the film itself has low mechanical strength, problems such as tearing of the film may arise. For these reasons, a polarizing plate is used, which is obtained by bonding a protective film to one or both sides of the polarizer to enhance the strength.

Meanwhile, in recent years, the application of liquid crystal displays has been expanded to include mobile terminals, and wide-screen televisions for home use. Thus, technology has been developed in order to guarantee excellent display qualities in each liquid crystal display. In the display qualities of liquid crystal displays, the colors of a polarizer and a polarizing plate are as important as the degree of polarization.

In the prior art, in order to control the color of polarizing plates, methods have been used, including controlling the time during which a polyvinyl alcohol-based film is immersed in a treatment bath, or controlling the temperature of the treatment bath.

However, the above-described methods of controlling the time of immersion of the film in the treatment bath and the temperature of the treatment bath have a problem in that, when stretching conditions in a stretching process are changed, it is difficult to control the color, because the time of immersion of the film in the treatment bath and the temperature of the treatment bath should also be controlled.

For this reason, a color complement process of immersing a PVA-based film stretched in an aqueous potassium iodide (KI) solution was added during the manufacture of PVA-based polarizers in the prior art. Among the polarizer manufacturing processes, the color complement process employing the aqueous KI solution corresponds to a process that increases again the absorbance of the polarizer in a short-wavelength range (400-500 nm), which was reduced after the stretching process, thereby controlling the electro-optic characteristics of the polarizing plate, particularly the color.

However, in the above-described color complement process employing KI, when KI is excessively used to increase the color complementary effect, the amount of KI remaining in the polarizer manufactured by the above-described process will increase, thereby increasing the occurrence of cunic defects (local surface irregularities), glittering, the generation of foreign matter defects in the polarizing plate, etc. In addition, when a polarizing plate is exposed to a high temperature higher than 80° C. for a long period of time, the degree of polarization of the polarizing plate will decrease, and the color will change, indicating that the polarizing plate has poor heat resistance.

As described above, the prior art method for controlling the color of a polarizing plate has problems in that it is difficult to control the color and in that the physical properties of the manufactured polarizing plate are also reduced. For this reason, there is a need to develop a new method for controlling the color of a polarizing plate.

DISCLOSURE

Technical Problem

The present invention has been made in order to solve the above-described problems occurring in the prior art, and it is an object of the present invention to provide a method for manufacturing a polarizing plate having excellent heat resistance, which is simple and minimizes the occurrence of cunic defects, glittering and the occurrence of foreign matter defects in the polarizing plate, compared to conventional methods for controlling the color of a polarizing plate, and a polarizing plate manufactured by the method.

Technical Solution

In accordance with an embodiment of the present invention, there is provided a method for manufacturing a polarizing plate, the method comprising the sequential steps of: preparing a polarizing element comprising a polyvinyl alcohol-based polarizer dyed with any one or more of iodine and a dichroic dye; irradiating the polarizing element with light having a specific wavelength selected from a wavelength range of 200 nm to 800 nm; and moistening the polarizing element.

In the method, the step of irradiating the polarizing element with light may be performed at an intensity of 0.5-550 $J/cm^2$.

Also, the step of irradiating the polarizing element with light may be performed using a light-emitting diode (LED) lamp or a laser lamp.

The step of moistening the polarizing element may be performed by maintaining the polarizing element at a temperature of 40° C. to 70° C. and a relative humidity of 90% or more for 10 minutes to 3 hours.

In accordance with another embodiment of the present invention, there is provided a polarizing plate comprising a polyvinyl alcohol-based polarizer dyed with any one or more of iodine and a dichroic dye, the polarizing plate having a ratio of cross absorbance measured at 460 nm to cross absorbance measured at 620 nm of 1:0.8 to 1:1.1.

Herein, the polarizing plate preferably has a single-color "b" value of 3.5 to 4.6 and a cross-color "b" value of −1 to 0.

The polarizing plate preferably has a degree of polarization of 99.9% or higher and a single transmittance of 42-45%, as measured after exposing the polarizing plate to a high temperature of 80° C. or higher for 500 hours.

In accordance with another embodiment of the present invention, there is provided an image display device comprising: a display panel; and the above polarizing plate attached to one or both sides of the display panel.

Advantageous Effects

According to the method for manufacturing a polarizing plate of the present invention, the polarizing plate which has a color close to natural black as a result of reducing the transmittance thereof in a short wavelength range of the polarizing plate, can be manufactured by irradiating light directly to a polarizing element comprising a polyvinyl alcohol-based polarizer dyed with iodine or a dichroic dye, and moistening the irradiated polarizing element.

The polarizing plate manufactured by the method of the present invention has advantages in that the occurrence of foreign matter, which occurs when a separate chemical color complement process is performed, can be reduced, and in that the polarizing plate has excellent heat resistance.

DESCRIPTION OF DRAWINGS

FIG. 1 is a graph showing the absorption spectra as a function of cross absorbance of polarizing plates manufactured in Example 1 and Comparative Examples 1 to 3.

FIG. 2 is a graph showing the change in cross transmittance of the absorption axis of a polarizing plate, manufactured in the Manufacturing Example, as a function of time when the polarizing plate was maintained at a relative humidity of 90% after irradiated with light having a wavelength of 532 nm at an intensity of 20 J/cm$^2$.

BEST MODE

Hereinafter, preferred embodiments of the present invention will be described. However, the present invention is not limited to the exemplary embodiments disclosed below and can be embodied in a variety of different forms. Moreover, these embodiments are provided so that this disclosure will be thorough and complete, and will fully convey the scope of the present invention to those skilled in the art.

The present inventors have conducted many studies to develop a method of controlling the color of a polarizing plate without regard to a color complement process that is performed in a process of stretching a polarizer during the manufacture of the polarizer, and as a result, have found that, when a polarizing plate is manufactured through a method comprising the sequential steps of: preparing a polarizing element comprising a polyvinyl alcohol-based polarizer dyed with iodine and/or a dichroic dye; irradiating the polarizing element with light having a specific wavelength selected from a wavelength range of 200 nm to 800 nm; and moistening the polarizing element, a polarizing plate having excellent heat resistance and a color close to natural black can be manufactured in a simple manner while minimizing the occurrence of cunic defects, foreign matter and the like in the polarizing plate, thereby completing the present invention.

A method for manufacturing a polarizing plate according to the present invention comprises the sequential steps of: preparing a polarizing element comprising a polyvinyl alcohol-based polarizer dyed with any one or more of iodine and a dichroic dye; irradiating the polarizing element with light having a specific wavelength selected from a wavelength range of 200 nm to 800 nm; and moistening the polarizing element.

In the method of the present invention, the polarizing element comprising the polyvinyl alcohol-based polarizer dyed with any one of iodine and a dichroic dye includes either a polyvinyl vinyl-based polarizer dyed with iodine and/or a dichroic dye, or a polarizing plate comprising a protective film attached to at least one side of the polarizer.

Meanwhile, the step of preparing the polarizing element comprising the polyvinyl alcohol-based polarizer dyed with any one or more of iodine and a dichroic dye may comprise the steps of: dyeing a polyvinyl alcohol-based film with iodine and/or a dichroic dye; crosslinking the polyvinyl alcohol-based film and the dye; and stretching the polyvinyl alcohol-based film.

The dyeing step is performed to dye the polyvinyl alcohol-based film with a dichroic iodine molecule and/or dye molecule. Herein, the iodine molecule and/or the dye molecule functions to absorb light oscillating in the stretching direction of the polarizing plate, and allows light, which oscillates in the vertical direction, to pass therethrough, so that polarized light having a specific oscillating direction can be obtained. This dyeing step may generally be performed by immersing the polyvinyl alcohol-based film in a treatment bath including a solution containing a dichroic material, such as an iodine solution.

A solvent that is used in the solution in the dyeing step is generally water, but it may contain a suitable amount of a water-compatible organic solvent. Meanwhile, iodine and/or the dichroic dye may be used in an amount of 0.06-0.25 parts by weight based on 100 parts by weight of the solvent. When the amount of iodine and/or dichroic dye used is within the above range, the transmittance of a polarizer obtained after stretching can satisfy the range of 42.0-47.0%.

Meanwhile, when iodine is used as the dichroic material, the solution preferably additionally contains a dyeing assistant such as an iodine compound in order to improve the dyeing efficiency. The dyeing assistant may be used in an amount of 0.3-2.5 parts by weight based on 100 parts by weight of the solvent. The reason for the addition of the dyeing assistant such as an iodine compound is to increase the solubility of iodine in water, because iodine has low water solubility. Meanwhile, the mixing ratio between iodine and the iodine compound is preferably about 1:5 to 1:10.

Specific examples of an iodine compound that may additionally be used in the present invention include, but are not limited to, potassium iodide, lithium iodide, sodium iodide, zinc iodide, aluminum iodide, lead iodide, copper iodide, barium iodide, calcium iodide, tin iodide, titanium iodide, and mixtures thereof.

Meanwhile, the temperature of the treatment bath may be maintained at a temperature between about 25° C. and about 40° C. If the temperature of the treatment bath is lower than 25° C., the dyeing efficiency can decrease, and if the temperature of the treatment bath is higher than 40° C., a large amount of iodine and/or the dichroic dye can be sublimated, resulting in an increase in the amount of iodine and/or dichroic dye used. In addition, the polyvinyl alcohol-based film may be immersed in the treatment bath for about 30-120 seconds. If the polyvinyl alcohol-based film is immersed for less than 30 seconds, uniform dyeing of the polyvinyl alcohol-based film cannot be achieved, and if the immersion time is more than 120 seconds, the dye will be saturated, and thus the film does not need to be immersed for 120 seconds.

The crosslinking step is generally performed using an immersion method in which the polyvinyl alcohol-based film is immersed in an aqueous boric acid solution or the like, but it may also be performed by an application or spray method in which the solution is sprayed onto the film.

The immersion method as an example of the crosslinking step is performed in the following manner. After the polyvinyl alcohol-based film was dyed with iodine and/or the dichroic dye in the dyeing step, iodine and/or the dichroic dye is adsorbed onto a polymer matrix of the polyvinyl alcohol-based film using a crosslinking agent. This crosslinking step is performed by immersing the polyvinyl alcohol-based film in a crosslinking bath including a solution containing the crosslinking agent. This is because, if an iodine molecule is not properly adsorbed onto the polymer matrix, the polarizing plate cannot perform its function due to its low degree of polarization.

A solvent that is used in the solution of the crosslinking bath is generally water, but it may contain a suitable amount of a water-compatible organic solvent. The crosslinking agent may be added in an amount of 0.5-5.0 parts by weight based on 100 parts by weight of the solvent. If the crosslinking agent is added in an amount of less than 0.5 parts by weight, the degree of crosslinking in the polyvinyl alcohol-based film will be insufficient, and thus the strength of the polyvinyl alcohol-based film in water will be reduced, and if the crosslinking agent is added in an amount of more than 5.0 parts by weight, excessive crosslinking will occur, resulting in a decrease in the stretchability of the polyvinyl alcohol-based film.

In addition, specific examples of the crosslinking agent include, but are not limited to, boron compounds such as boric acid or borax, glyoxal, glutaraldehyde and the like, which may be used alone or in combination.

Meanwhile, the temperature of the crosslinking bath varies depending on the amount of the crosslinking agent and the stretching ratio of the film, and is preferably between 45° C. and 60° C., but is not limited thereto. Generally, as the amount of the crosslinking agent increases, the temperature of the crosslinking bath is controlled to a high temperature in order to increase the mobility of chains in the polyvinyl alcohol-based film, and as the amount of the crosslinking agent decreases, the temperature of the crosslinking bath is controlled to a low temperature. However, in the present invention, the temperature of the crosslinking bath should be maintained at 45° C. or higher in order to increase the stretchability of the polyvinyl alcohol-based film, because the film is at least 5-fold stretched.

Meanwhile, the time of immersion of the polyvinyl alcohol-based film in the crosslinking bath is preferably 30-120 seconds. If the immersion time is less than 30 seconds, uniform crosslinking of the polyvinyl alcohol-based film cannot be achieved, and if the immersion time is more than 120 seconds, crosslinking will be saturated, and thus the film does not need to be immersed for more than 120 seconds.

Meanwhile, "stretching" in the stretching step refers to uniaxially stretching a film in order to align the polymer molecules of the film in a specific direction. Stretching methods can be divided into wet stretching methods and dry stretching methods. The dry stretching methods are further divided into an inter-roll stretching method, a heating roll stretching method, a press stretching method, a tenter stretching method, etc., and the wet stretching methods are further divided into a tenter stretching method, an inter-roll stretching method, etc. In the present invention, the stretching method is not specifically limited, and the wet stretching method and the dry stretching method may all be used, and may be used in combination, if necessary.

The stretching step is preferably performed by stretching the polyvinyl alcohol-based film at a ratio of 4:1 to 7:1 and at a temperature between 45° C. and 60° C. In order to impart polarizing performance to the polyvinyl alcohol-based film, chains in the polyvinyl alcohol-based film should be aligned. At a stretching ratio of less than 4:1, chains in the polyvinyl alcohol-based film cannot be sufficiently aligned, and at a stretching ratio of more than 7:1, chains in the polyvinyl alcohol-based film can be cleaved. In addition, the stretching temperature of the polyvinyl alcohol-based film may vary depending on the content of the crosslinking agent. At a temperature of less than 45° C., the mobility of chains in the polyvinyl alcohol-based film can be reduced, resulting in a decrease in the stretching efficiency, and at a temperature of more than 60° C., the polyvinyl alcohol-based film will become soft, and thus have reduced strength.

Meanwhile, the stretching step may be performed simultaneously with or separately from the dyeing step or the crosslinking step. If the stretching step is performed simultaneously with the dyeing step, the dyeing step is preferably performed in an iodine solution, and if the stretching step is performed simultaneously with the crosslinking step, the crosslinking step is preferably performed in an aqueous solution of boric acid.

The polarizing element that is used in the present invention may be either the polarizer manufactured as described above, or a polarizing plate comprising a protective film attached to at least one side of the polarizer. Because the polarizer has a very thin thickness, a protective film that protects the polarizer is generally attached to one or both sides of the polarizer to form a polarizing plate. As used herein, the term "protective film" refers to a transparent film that is attached to both sides of the polarizing element in order to protect the polarizer. The protective film that is used in the present invention may be an acetate-based resin film such as a triacetyl cellulose (TAC) film, a polyester-based resin film, a polyethersulfone-based resin film, a polycarbonate-based resin film, a polyamide-based resin film, a polyimide-based resin film, or a polyolefinic resin film, but is not limited thereto.

Herein, the protective film may be laminated using an adhesive. As the adhesive, a polyvinyl alcohol-based aqueous adhesive may be used, but is not limited thereto. In addition to the protective film, the polarizing plate may additionally comprise a functional film such as a wide-viewing angle compensating plate or a brightness enhancing film in order to improve additional functions.

The method of the present invention comprises, after the step of preparing the polarizing element, a step of irradiating the polarizing element with light having a specific wavelength selected from a wavelength range of 200 nm to 800 nm.

According to studies conducted by the present inventors, it was found that, when the step of irradiating the polarizing element with light having a specific wavelength selected from the above-described wavelength range is performed, the irradiated light induces vibronic excitation of the iodine and/or dichroic dye, which is present in the polarizer and absorbs light in the above wavelength range. Due to the vibronic excitation of the dye molecules, the molecules of the iodine or/and dichroic dye are excited from an electronic ground state to an electronic excited state. Then, the iodine and/or dichroic dye in the electronic excited state is dissociated so that the chemical bond is broken, and thus the iodine and/or dichroic dye that absorbs light in the above wavelength range is decomposed into compounds that absorb light in a short-wavelength range (UV wavelength range or short visible wavelength range). For this reason, the polarizing function of the polarizing plate in the wavelength range of 400-800 nm that is in the visible wavelength range is removed so that the transmittance of the polarizing plate is increased, making the polarizing plate transparent.

When the step of moistening the polarizing element is performed as described below, the polarizing function and color of the polarizing plate are changed by the reaction between the decomposed iodine and/or dichroic dye compounds. When the polarizing element is moistened, the transmittance of the polarizing element is lowered again due to recombination of the decomposed iodine, and the color of the polarizing element is determined according to the concentration of an iodine compound that absorbs light in a short wavelength range and the concentration of an iodine compound that absorbs light in a long wavelength range.

Meanwhile, in the irradiating step, UV or visible light having a specific wavelength selected from the wavelength range of 200 nm to 800 nm may be irradiated, and more preferably, light having a wavelength ranging from 400 nm to 750 nm may be irradiated. After transition of the iodine molecule to the electronic excited state, the chemical bond of the molecule is broken by a strong oscillating movement with heat, and for this reason, light in the wavelength range that can be absorbed by iodine should be irradiated. More preferably, the decomposition of the iodine molecule can easily occur in the wavelength range of 400-750 nm (having a higher extinction coefficient) in which a slightly larger quantity of light can be absorbed by iodine.

Moreover, the step of irradiating the polarizing element with light is preferably performed at an intensity of 0.5-550 $J/cm^2$, and more preferably 0.8-50 $J/cm^2$. For example, light may be irradiated at an intensity of 1-20 $J/cm^2$. Depending on the irradiation intensity of light, the degree of depolarization and color of the polarizing element can be determined. If the irradiation intensity is higher than 550 $J/cm^2$, the polarizing element can be distorted by strong energy, or the alignment of molecules in the polyvinyl alcohol-based film can be adversely affected. If the irradiation intensity is lower than 0.5 $J/cm^2$, the change in color of the polarizing element by light irradiation will be insignificant, and thus it will be difficult to control the color of the polarizing element.

Meanwhile, in the irradiation (exposure) step, the polarizing element, that is, the polarizer or the polarizing plate, may be irradiated with light using a masking process, a light-emitting diode (LED) lamp or a laser lamp. More preferably, the irradiating step is performed using a light-emitting diode (LED) lamp or a laser lamp. When a light-emitting diode (LED) lamp or a laser lamp is used, the polarizing plate can be exposed to light from the lamp while the light accurately targets a desired local region of the polarizing plate due to its directionality, and thus the color of the polarizing plate can be properly controlled.

When a light-emitting diode (LED) or a laser is used, it is preferred to control the polarization of light source because of the characteristics of the polarizing plate having a light absorption axis and a light transmission axis. When the polarization direction of light source is consistent with the direction of the absorption axis of the polarizing plate, a more effective increase in the transmittance and a more effective decrease in the degree of polarization can be observed, and the loss of the power that is consumed by the light source can also be prevented. If the polarization direction of light from the light source is consistent with the direction of the absorption axis of the polarizing plate, light from the light source may have any incident angle with respect to the polarizing plate. However, if the polarization direction of light from the light source is not consistent with the direction of the absorption axis of the polarizing plate, the effect of the light on depolarization will significantly decrease. In the Examples of the present invention, light having a wavelength of 532 nm was irradiated using a Verdi laser (Coherent Inc.), and it was irradiated onto the polarizing plate using an optical lens at a distance of 40 cm forward from the focal spot. Also, polarized light from the light source was irradiated using a laser that predominantly emitted vertical polarized light at more than 100:1, and polarized light consistent with the absorption axis of the polarizing plate was irradiated at an angle of 5° or less. The light irradiation caused a local depolarized region having a diameter of 1 cm and increased transmittance.

Finally, the method of the present invention comprises a step of moistening the irradiated polarizing element.

The step of moistening the irradiated polarizing element may be performed by maintaining the polarizing element at a temperature of 40° C. to 70° C. and at a relative humidity of 80% or higher for 10 minutes to 3 hours. Preferably, the polarizing element is maintained at a temperature of 60° C. and a relative humidity of 90% or higher for 20 minutes to 1 hour. This step of moistening the polarizing element may be performed using a constant temperature and humidity unit whose temperature and humidity are controllable. If the step of moistening the polarizing element is performed at a temperature higher than 70° C., the optical properties of the polarizer can be adversely affected.

Meanwhile, as can be seen in FIG. 2, as the moistening time increases, the transmittance of the absorption axis of the polarizing plate in both a short wavelength region (460 nm) and a long wavelength region (620 nm) decreases. Particularly, in case that the moistening time is longer than about 20 minutes, the transmittance decreases rapidly.

When the step of moistening the polarizing element is performed, the mobility of the iodine and/or dichroic dye molecules, decomposed into compounds that absorb light in a short wavelength range by a dissociation process in the light irradiating step, is increased by moisture. For this reason, some of the molecules are recombined by van der Waals force, and as a result, compounds that absorb light in a long wavelength range are produced again from the decomposed compounds. Specifically, two iodine (I) atoms first combine to form $I_2$, and thus the transmittance in a short wavelength region (460 nm) decreases, and then five I atoms recombine, and thus the transmittance in a long wavelength region (620 nm) decreases. In other words, the color of the polarizing plate can be controlled by controlling the moistening time. As a result, as compounds that absorb long-wavelength light are balanced with compounds that absorb short-wavelength light, the absorption of short-wavelength light increases compared to that in the initial polarizing plate, and thus the color of the polarizing plate becomes closer to black.

More specifically, when a polyvinyl alcohol film dyed with potassium iodide (KI) is stretched, the polyvinyl alcohol-iodine complex (PVA-Ix complex) forms a linear array, and iodine is arranged on the film to form an atom chain. At this time, the color of the polarizing plate changes depending on the distribution of iodine dyed on the polyvinyl alcohol (PVA) film. Iodine dyed on the polyvinyl alcohol film is present in various forms such as $I_5^-$, $I_3^-$, $I_2$ and $I^-$. Because such iodine molecules absorb light in different wavelength regions, the color of the polarizing plate becomes more bluish as the amount of $I_5^-$ increases, and becomes more reddish or yellowish as the amount of $I_2$ and $I_3^-$ increases.

After initial dyeing and stretching, $I_5^-$ that absorbs light in a long wavelength region (620 nm) is mainly produced, and thus the polarizing plate becomes bluish. When $I_5^-$ is dissociated by the light irradiating step, $I_5^-$ is decomposed into $I_3^-$ and 2I. When the step of moistening the irradiated polarizing plate is performed, the mobility of the decomposed 2I is increased by moisture, and due to the increase in the mobility, unstable 2I bonds to $I_2$ to reduce the transmittance in a short wavelength region (460 nm), and then bonds to $I_3^-$ to produce $I_5^-$ to thereby reduce the transmittance in a long wavelength region (620 nm). As a result, $I_5^-$ decreases and $I_2$ increases, and thus the polarizing plate that has mainly absorbed long-wavelength light absorbs an increased amount of short-wavelength light, and thus has a color close to natural black.

Meanwhile, in conventional color complement processes, $I^-$ is supplied to the PVA-Ix complex during or after a stretching process to induce a forward reaction of the following reaction formula 1 to thereby control the color to black. Methods capable of promoting the forward reaction of reaction equation 1 include a method of supplying KI to make the forward reaction predominant, and a heating method. However, if the forward reaction of reaction equation 1 is severe, it is difficult to control the color of the polarizer, because most ion species are present as $I_3^-$, $I_2$ and $I^-$, and thus the polarizing property of the polarizer is reduced, and the color of the polarizer becomes very reddish.

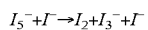  Reaction Equation 1

Particularly, if a chemical color complement process is performed using KI, the amount of KI remaining in the manufactured polarizer and polarizing plate will increase, thereby increasing the occurrence of cunic defects, glittering, the foreign matter defects in the polarizing plate, etc. In addition, if a polarizing plate is exposed to a high temperature for a long period of time, the heat resistance thereof will be reduced, resulting in a decrease in the degree of polarization and a change in the color. Specifically, the residue of KI added in the color complement process will react with $KI_5$ at high temperature to increase $I_3^-$ and $I_2$, thus deteriorating the color and optical properties of the polarizing element. On the contrary, the manufacturing method according to the present invention has advantages in that, because a step of adding and preparing an additional compound is not performed, the occurrence of foreign matter defects can be minimized, and problems associated with a decrease in the heat resistance of the polarizing plate can be overcome.

Meanwhile, as can be seen from the graph in FIG. 1, before the light irradiating step and the moistening step were not performed (Comparative Example 1), the absorption of short-wavelength light was insignificant, but after the process according to the present invention was performed, the absorption of light in a short wavelength range (400 nm to 550 nm) greatly increased to an extent similar to the absorption of light in a long wavelength range (551 nm to 700 nm). Specifically, the polarizing plate, which has mainly absorbed light in a long wavelength region to have blue, absorbs an increased amount of light in a short wavelength region to show a color close to natural black after being subjected to the process of the present invention. It can be seen that the process of the present invention provides remarkable effects compared to a conventional chemical color complement process (Comparative Example 3).

In another aspect, the present invention provides a polarizing plate manufactured by the above-described method.

Specifically, the polarizing plate according to the present invention is a polarizing plate manufactured by the above-described method, and preferably comprises a polyvinyl alcohol-based polarizer dyed with any one or more of iodine and a dichroic dye, and has a ratio of cross absorbance measured at 460 nm to cross absorbance measured at 620 nm of 1:0.8 to 1:1.1.

As described above, the polarizing plate of the present invention is manufactured by irradiating the polarizing element with light having a specific wavelength, and then moistening the irradiated polarizing element so as to reproduce the iodine and/or dichroic dye that absorbs visible light in a long wavelength range and a short wavelength range. Thus, the polarizing plate of the present invention can uniformly absorb light in the visible wavelength range. However, as can be seen from the graph in FIG. 1, in the case of a polarizing plate subjected to a conventional chemical complement process, the absorption of light in a short wavelength region is insignificant. Specifically, in this case, the cross absorbance measured at about 460 nm is only 1.8, and the ratio of cross absorbance measured at 460 nm to cross absorbance measured at 620 nm is about 1:1.5.

However, in the case of the polarizing plate according to the present invention, the ratio of cross absorbance measured at 460 nm to cross absorbance measured at 620 nm is 1:0.8 to 1:1.1, and preferably 1:0.9 to 1:1.1. When the cross absorbance values measured at the above wavelengths are in the above range, the absorption of short-wavelength light and the absorption of long-wavelength light in the polarizing plate are similar to each other, and thus the polarizing plate has a color close to natural black.

The above-described cross absorbance values are values obtained by measuring the cross transmittances (Tc) of the polarizing plate at 460 nm and 620 nm using a UV-Vis spectrophotometer and substituting the measured cross transmittances into the following equation:

Cross absorption=$-\text{Log}_{10} Tc$.

Herein, the polarizer and the polarizing plate are as described above, and thus the detailed description thereof is omitted.

Preferably, the single color "b" value of the polarizing plate is 3.5 to 4.6, and the cross color "b" value is −1 to 0.

As used herein, the term "single color" refers to a color obtained when natural color is irradiated to a single polarizing plate, and the term "cross color" refers to a color obtained when natural light is irradiated to two polarizing plates stacked on each other in such a manner that the absorption axes thereof cross each other at a right angle.

Also, the color "a" and the color "b" refer to color values that are expressed in the CIE coordinate system. More specifically, the color "a" value is calculated according to $a=500[(X/Xn)^{1/3}-(Y/Yn)^{1/3}]$. "+a" means red, and "−a" means green. Also, the color "b" value is calculated according to $b=200[(Y/Yn)^{1/3}-(Z/Zn)^{1/3}]$. "+b" means yellow, and "−b" means blue. Herein, Xn, Yn and Zn correspond to X, Y and Z of white serving as a standard, respectively.

Specifically, the single color "a" and "b" values mean the color "a" and "b" values in the CIE coordinate system, obtained by measuring single polarizer colors using a color difference meter. The cross color "a" and "b" values mean the color "a" and "b" values in the CIE coordinate system, obtained by measuring the colors of a pair of polarizers, arranged such that their absorption axes cross each other, using a color difference meter.

Specifically, the single color "b" value is preferably in the range of 3.5 to 4.6. If the single color "b" value of polarizers arranged to cross each other is less than 3.5, the color will be bluish, and if the single color "b" value is more than 4.6, the color will be yellowish, and thus it will difficult to realize natural black, and the contrast ratio (CR) value can be reduced.

More specifically, in the prior art, when the conditions of the dyeing, crosslinking and stretching steps changed, the single color "b" value of the polarizer would change, and for this reason, it was required to change other conditions in order to control the single color "b" value. Thus, as described above, it was difficult to control the single color "b" value of the polarizer in the dyeing, crosslinking and stretching steps. However, the inventive method for manufacturing a polarizing plate according to the present invention has an advantage in that, when the single color "b" value after the dyeing, crosslinking and stretching steps is out of a desired range, the single color "b" value can be simply controlled by irradiating the polarizing plate with light and moistening the irradiated polarizing plate.

Meanwhile, the cross color "b" value is preferably closer to 0 in order to realize natural black. More preferably, it is −1 to 0.

The degree of polarization (DOP) of the polarizing plate manufactured by the method of the present invention may be 99.9% or higher, and preferably, for example, 99.98% or higher. If a polarizing plate has a high degree of polarization, it may have high contrast ration (CR). When the color of a polarizer is controlled by irradiating it with UV light according to the manufacturing method of the present invention, there is an advantage in that a polarizing plate having a degree of polarization of 99.98% or higher can be manufactured.

In addition, the polarizing plate has a degree of polarization of 99.9% or higher, and preferably 99.98% or higher, as measured after the heat resistance of the polarizing plate was evaluated by exposing it to a high temperature of 80° C. or higher for 500 hours. Also, the polarizing plate preferably has a single transmittance (Ts) of 42-45%. Unlike the case in which a conventional chemical color complement process is performed, in the present invention, chemical treatment is not performed, and iodine and/or a dichroic dye is decomposed by irradiation with light, and then recombined by moistening to form compounds that absorb single-wavelength light and long-wavelength light. Thus, this process of the present invention is advantageous in terms of thermal stability, compared to the conventional chemical color complement process using KI. However, the conventional chemical color complement process using KI is disadvantageous in terms of thermal stability, because the remaining KI induces the decomposition of $KI_5$ at a high temperature to produce $KI_3$ and $I_2$ to thereby reduce the absorption of long-wavelength light and increase the absorption of short-wavelength light.

Meanwhile, the degree of polarization (DOP) is defined as the following equation 1 by the parallel transmittance (Tp) obtained for two polarizing plates, arranged such that their absorption axes are parallel with each other, and the cross transmittance (Tc) obtained for two polarizing plates arranged such that their absorption axes cross each other at an angle of 90°.

Degree of polarization=$[(Tp-Tc)/(Tp+Tc)]^{1/2}$ [Equation 1]

Meanwhile, the polarizing plate of the present invention as described above can be advantageously applied to image display devices by attaching it to one or both sides of display panels. The display panels may be a liquid crystal panel, a plasma panel and an organic light-emitting panel, and thus the image display devices may be a liquid crystal display (LCD), a plasma display panel (PDP) and an organic light emitting diode (OLED).

More specifically, the image display device may be a liquid crystal display comprising: a liquid crystal panel, and polarizing plates provided on both sides of the liquid crystal panel, respectively, wherein at least one of the polarizing plates may be the polarizing plate of the present invention. In other words, the polarizing plate is characterized in that it is manufactured by irradiating a polarizing element, comprising a polyvinyl alcohol-based polarizer dyed with iodine and/or a dichroic dye, with light having a specific wavelength selected from a wavelength range of 200 nm to 800 nm, and then moistening the polarizing element, and has a single color "b" value of 3.5 to 4.6.

Herein, the kind of liquid crystal panel that is included in the liquid crystal display is not specifically limited. Examples of the liquid crystal panel include, but are not limited to, all known panels, including passive matrix panels such as twisted nematic (TN) panels, super twisted nematic (STN) panels, ferroelectric (F) or polymer dispersed (PD) panels; active matrix panels such as two-terminal type panels or three-terminal type panels; in-plane switching (IPS) panels and vertical alignment (VA) panels, etc. In addition, the kinds of other components of the liquid crystal display, for example, upper and lower substrates (e.g., a color filter substrate or an array substrate), are not specifically limited, and those known in the art may be used without limitation.

MODE FOR INVENTION

Hereinafter, the present invention will be described in further detail with reference to examples. However, these examples are provided for a better understanding of the present invention and are not intended to limit the scope of the present invention.

Manufacturing Example

A polyvinyl alcohol-based film (Japanese Synthetic Rubber Co.; M3000 grade; 30 μm) was subjected to a swelling process in pure water at 25° C. for 15 seconds, and then subjected to a dyeing process in a 0.2 wt % iodine solution at 25° C. for 60 seconds. Next, the film was subjected to a cleaning process in a 1 wt % boric acid solution at 45° C. for 30 seconds, and then was 6-fold stretched in a 2.5 wt % boric acid solution at 52° C. Then, the film was dried in an oven at 60° C. for 5 minutes, thereby manufacturing a polarizer having a thickness of 12 μm.

A triacetyl cellulose (TAC) film having a thickness of 40 μm was placed and laminated on both surfaces of the manufactured PVA polarizer using a PVA-based water-soluble adhesive, and was then dried in an oven at 80° C. for 5 minutes, thereby manufacturing a polarizing plate having a structure of TAC/PVA/TAC.

Example 1

The polarizing plate manufactured in the Manufacturing Example was cut to a size of 60 mm×60 mm, and then exposed to light having a wavelength of 532 nm at an intensity of 20 J/cm² using a laser (Verdi V2, Coherent Inc.). Next, the polarizing plate was subjected to a color complement process by maintaining it in a constant temperature and humidity unit (TH-I-300, YOKOGAWA Co., Ltd.) at a temperature of 60° C. and a relative humidity of 90% for 60 minutes, thereby manufacturing a polarizing plate.

Comparative Example 1

A polarizing plate was manufactured in the same manner as described in the Manufacturing Example without performing other additional steps.

Comparative Example 2

The polarizing plate manufactured in the Manufacturing Example was cut to a size of 60 mm×60 mm, and then exposed to light having a wavelength of 532 nm at an intensity of 20 J/cm² using a laser (Verdi V2, Coherent Inc.), thereby manufacturing a polarizing plate.

Comparative Example 3

A polyvinyl alcohol-based film (Japanese Synthetic Rubber Co.; M3000 grade; 30 μm) was subjected to a swelling process in pure water at 25° C. for 15 seconds, and then subjected to a dyeing process in a 0.2 wt % iodine solution at 25° C. for 60 seconds. Next, the film was subjected to a cleaning process in a 1 wt % boric acid solution at 45° C. for 30 seconds, and then was 6-fold stretched in a 2.5 wt % boric acid solution at 52° C. After stretching, the film was subjected to a color complement process in a 5 wt % KI solution, and then dried in an oven at 60° C. for 5 minutes, thereby manufacturing a polarizer having a thickness of 12 μm.

A triacetyl cellulose (TAC) film having a thickness of 40 μm was placed and laminated on both surfaces of the manufactured PVA polarizer using a PVA-based water-soluble adhesive, and was then dried in an oven at 80° C. for 5 minutes, thereby manufacturing a polarizing plate having a structure of TAC/PVA/TAC.

Test Example: Evaluation of Optical Properties

1. Measurement of Optical Properties

Each of the polarizing plates manufactured in Example 1 and Comparative Examples 1 to 3 was cut to a size of 40 mm×40 mm. Each of the cut samples was fixed to a measurement holder, and then measured for its initial optical properties, that is, single transmittance (Ts), degree of polarization, and colors (single color "a", single color "b", cross color "a", and cross color "b"), using a UV-Vis spectrophotometer (V-7100, JASCO Co., Ltd.). The single transmittance (Ts) and the single colors ("a" and "b") were measured for a single polarizing plate, and the cross colors (cross color "a" and cross color "b") were measured for two cut polarizing plates arranged such that their absorption axes crossed each other at an angle of 90°. The results of the measurement are shown in Table 1 below.

The degree of polarization is defined as the following equation 1 by the parallel transmittance (Tp) obtained for two polarizing plates, arranged such that their absorption axes are parallel with each other, and the cross transmittance (Tc) obtained for two polarizing plates arranged such that their absorption axes cross each other at an angle of 90°.

Degree of polarization=$[(Tp-Tc)/(Tp+Tc)]^{1/2}$ [Equation 1]

2. Evaluation of Heat Resistance

The polarizing plates manufactured in the Example and the Comparative Examples were exposed to a temperature of 80° C. for 500 hours, and then the degree of polarization and single transmittance thereof were measured. The results of the measurement are shown in Table 1 below.

TABLE 1

| | Single color "a" | Single color "b" | Cross color "a" | Cross color "b" | Initial degree of polarization | Initial single transmittance (%) | Degree of polarization after high-temperature exposure | Single transmittance after high temperature exposure (%) |
|---|---|---|---|---|---|---|---|---|
| Example 1 | −1.38 | 3.95 | 0.40 | −0.90 | 99.98 | 42.32 | 99.98 | 42.50 |
| Comparative Example 1 | −0.72 | 1.61 | −0.12 | −6.06 | 99.82 | 42.39 | 99.31 | 44.95 |
| Comparative Example 2 | −8.6 | 18.6 | −11.31 | 24.18 | 8.43 | 86.35 | 8.31 | 86.36 |
| Comparative Example 3 | −1.34 | 4.76 | 0.41 | −0.13 | 99.98 | 42.55 | 99.30 | 44.17 |

As can be seen from Table 1 above, the polarizing plate of Example 1 had a single color "b" value and a cross color "b" value, which were in the ranges of 3.5 to 4.6, and −0.1 to 0, respectively, suggesting that it had a color close to natural black. In addition, even when it was exposed to the high temperature for 500 hours, the degree of polarization and single transmittance thereof did not substantially change, and were also very high, suggesting that the polarizing plate had excellent heat resistance.

Test Example 2: Measurement of Absorption Spectrum

The absorption spectra of the polarizing plates manufactured in Example 1 and Comparative Examples 1 to 3 were measured using DH-2000 (Ocean Optics Inc.) as a light source and USB4000 (Ocean Optics Inc.) as a detector. The results of the measurement are shown in FIG. 1.

As can be seen in FIG. 1, in the case of the polarizing plate manufactured according to the method of Example 1 of the present invention, the cross absorbance thereof in a short wavelength range (about 450 nm to 550 nm) was higher than that of the polarizing plate of Comparative Example 1 (in which the exposure and moistening steps were not performed), and was similar to the cross absorbance in a long wavelength range (about 551 nm to 650 nm). This indicates that the polarizing plate of the present invention shows a color close to natural black, because the cross absorbance thereof in the short wavelength range is similar to the cross absorbance in the long wavelength range.

Also, in the case of the polarizing plate of Comparative Example 3, manufactured through the conventional color complement process, the absorbance thereof in a short wavelength range (about 450 nm to 550 nm) slightly increased compared to that of the polarizing plate which was not subjected to the color complement process. However, in the case of the polarizing plate of Comparative Example 3, the peak absorbance thereof in the short wavelength range did not reach 2, whereas the peak absorbance of the polarizing plate of Example 1 in the short wavelength range was about 3.

In addition, in the case of Comparative Example 2 in which the moistening step was not performed after the exposure step, the absorbance in the entire visible wavelength range significantly decreased due to the decomposition of iodine compounds.

Test Example 3: Measurement of Change with Moistening Time

The 60 mm×60 mm polarizing plate manufactured in the Manufacturing Example was irradiated with light having a wavelength of 532 nm at an intensity of 20 J/cm² using a laser (Verdi V2, Coherent Inc.), and then allowed to stand at 60° C. and a relative humidity of 90% while the change in transmittance of the absorbance axis with time was measured. The results of the measurement are shown in FIG. 2.

As can be seen in FIG. 2, the transmittance in each wavelength region decreased rapidly after 20 minutes of moistening after the irradiation step.

Although the preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A method for manufacturing a polarizing plate, the method comprising the sequential steps of:
   preparing a polarizing element comprising a polyvinyl alcohol-based polarizer dyed with any one or more of iodine and a dichroic dye;
   decomposing the iodine and/or dichroic dye by irradiating the polarizing element with light having a specific wavelength selected from a wavelength range of 400 nm to 750 nm; and
   recombining some of the decomposed iodine and/or dichroic dye by moistening the polarizing element,
   wherein the step of irradiating the polarizing element with light is performed at an intensity of 0.5-550 J/cm², and
   wherein the step of moistening the polarizing element is performed by storing the polarizing element at a temperature of 40° C. to 70° C. and a relative humidity of 90% or more for 10 minutes to 3 hours.

2. The method of claim 1, wherein the step of irradiating the polarizing element with light is be performed using a light-emitting diode (LED) lamp or a laser lamp.

* * * * *